United States Patent [19]

Ishika

[11] Patent Number: 5,105,407
[45] Date of Patent: Apr. 14, 1992

[54] OPTICAL INFORMATION-PROCESSING APPARATUS

[75] Inventor: Sou Ishika, Kawasaki, Japan

[73] Assignee: Kabushiki Kaisha Toshiba, Kawasaki, Japan

[21] Appl. No.: 459,966

[22] Filed: Jan. 2, 1990

[30] Foreign Application Priority Data

Jan. 11, 1989 [JP] Japan .................. 1-2909
Jan. 11, 1989 [JP] Japan .................. 1-2910
Jan. 19, 1989 [JP] Japan .................. 1-8678

[51] Int. Cl.$^5$ ............................... G11B 7/00
[52] U.S. Cl. .................. 369/44.37; 369/44.41
[58] Field of Search ........... 369/44.22, 44.37, 44.41, 369/44.42

[56] References Cited

U.S. PATENT DOCUMENTS 4,694,443 9/1987 Ando .................. 369/44.24
4,890,272 12/1989 Ando .................. 369/44.24

FOREIGN PATENT DOCUMENTS 62-298035 12/1987 Japan .

OTHER PUBLICATIONS

Optical Memory Symposium '85, "Draw 2-Beam Optical Head by Using Laser Diode Array," by NEC Corp. p. 107.

*Primary Examiner*—Thomas G. Black
*Attorney, Agent, or Firm*—Finnegan, Henderson, Farabow, Garrett and Dunner

[57] ABSTRACT

In an optical information-processing apparatus, retrieving and recording laser beams are focused on an optical disk in a recording mode. The retrieving and recording laser beams are reflected from the optical disk and are transferred by the objective lens. The transferred retrieving laser beam is spatially separated from the transferred recording laser beam and is incident on the photo-sensitive region of a photodetector the edge of photo-sensitive region is so arranged as to be separated at distance d2 from the recording laser beam when the objective lens is in focusing state. The distance d2 satisfies the following inequality:

$$d2 < m\,d1$$

wherein d1 is a distance between the beam spot on the optical disk in the focusing state and m is a magnification of the optical system between the optical disk and the photodetector.

8 Claims, 6 Drawing Sheets

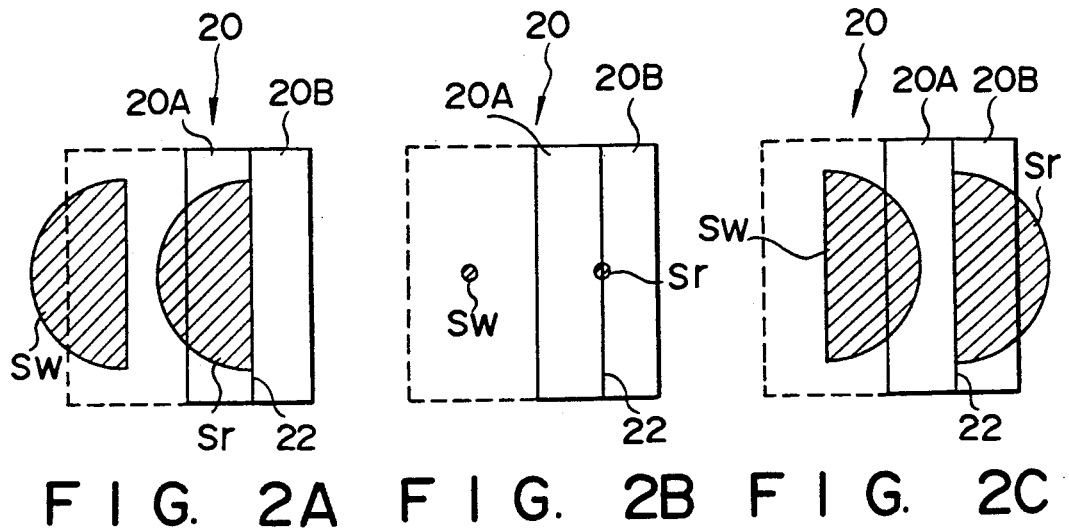
F I G. 2A    F I G. 2B    F I G. 2C
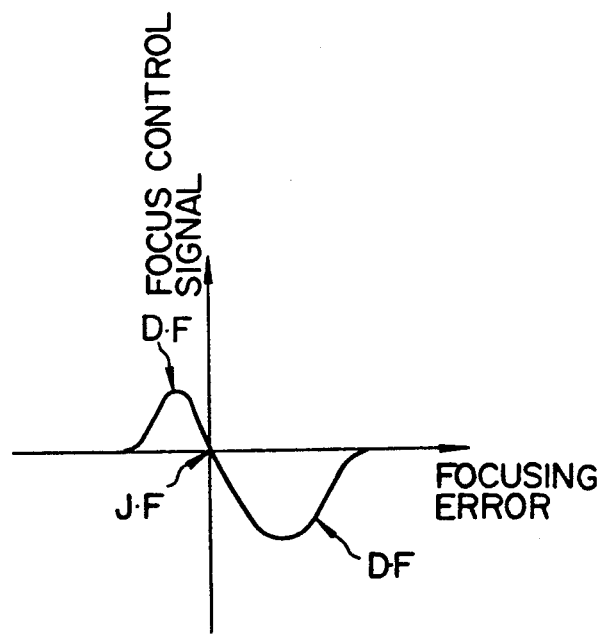
F I G. 3

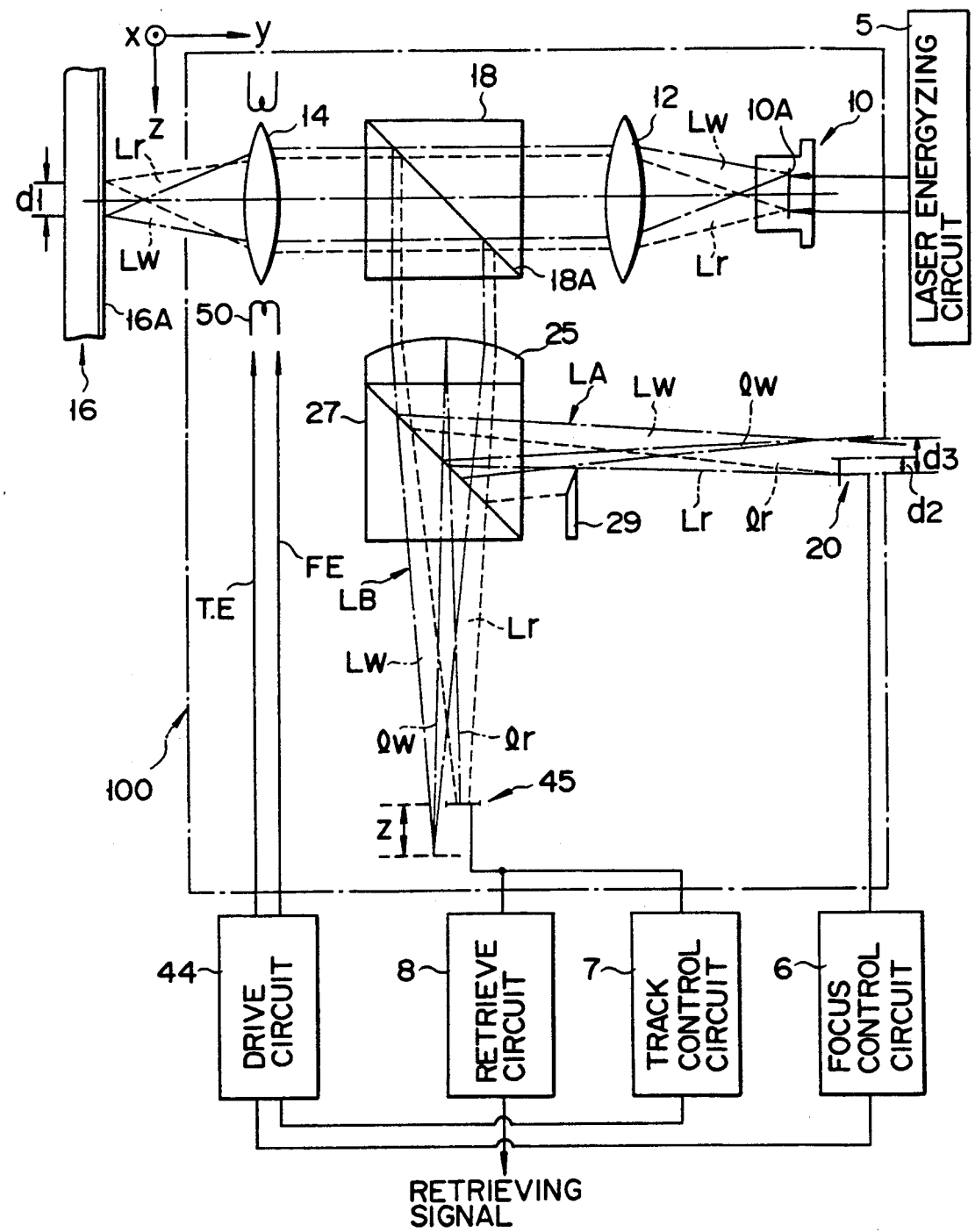
F I G. 4

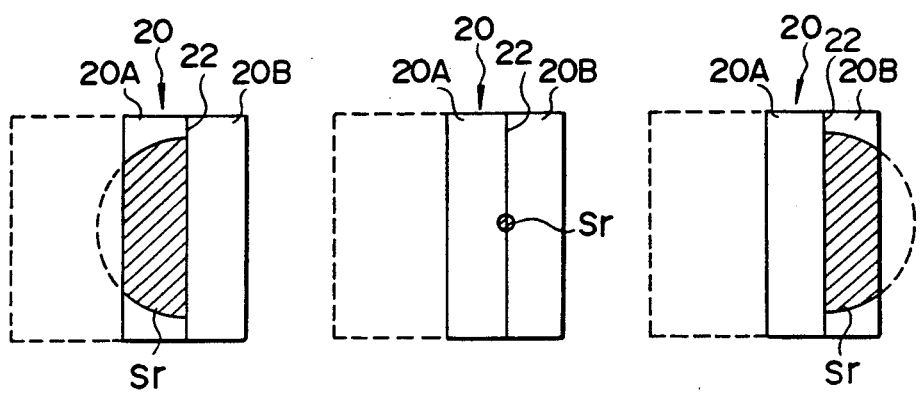
F I G. 8A   F I G. 8B   F I G. 8C

OPTICAL INFORMATION-PROCESSING APPARATUS

BACKGROUND OF THE INVENTION

1. Field of the Invention

This invention relates to an apparatus for processing information optically, and more particularly to an optical information-processing apparatus which is provided with a multi-beam optical head for simultaneously recording, retrieving and erasing information by the use of multi-light beams.

2. Description of the Related Art

There have been recently developed optical information processing apparatuses such as optical disc apparatuses which record image information of documents or the like, retrieve the required image information and reproduce the same as hard copies or soft copies. With the optical disc apparatus, a light beam is converged on a disc-shaped recording medium, for example, an optical disc, and information is recorded on the recording medium or retrieved therefrom. In more detail, in a recording mode, a light beam is modulated and the modulated light beam is converged on the optical disk so that the condition of the recording medium is changed, for example, so that pits are formed on the recording medium to record information on the optical disk. In a retrieving mode, a light beam having a constant light intensity is converged on an information recording medium and the intensity is modulated by the changed conditions of the recording medium or the pits according to the recorded information. The light beam thus modulated is detected and converted into electrical signals. By processing the signals, the information is reproduced. During recording and retrieving, the optical disc is rotated at a constant linear speed, and the light beam converged on the optical disc is linearly moved in the radial direction of the optical disc.

As one of the optical disc apparatuses, an optical information-processing apparatus has been recently developed which is provided with a multi-beam optical head for recording and retrieving information simultaneously by employing a plurality of light beams. FIG. 1 shows an example of the multi-beam optical head of such a conventional optical disc apparatus.

Referring to FIG. 1, recording light beams L1 and retrieving light beams L2 are emitted from a semiconductor laser array 1, transmitted through a beam splitter 2 and are converged on the recording surface 5A of an optical disc 5 through a reflecting prism 3 by an objective lens 4. In this case, it is preferred that the light beams L1 and L2 should be arranged such that their converged points lie adjacently to each other on the same track. With this arrangement, the recording and retrieving beam spots which are adjacent to each other are formed on a predetermined track on the recording surface. The optical disc on which the recording and retrieving beam spots are thus formed is rotated at a constant linear speed, whereby the predetermined recording area is first illuminated by the recording light beams and immediately thereafter by the retrieving light beams. In other words, retrieving is carried out immediately after recording. The light beams L1 and L2 converged on the recording surface 5A are reflected thereby and are returned to the beam splitter 2 through the objective lens 4 and the reflecting prism 3. Thereafter, both light beams L1 and L2 are reflected on the boundary face in the beam splitter 6 to be incident on a beam splitter 6. Part of each of the light beams L1 and L2 passes through the beam splitter 6 and is incident on a photo-detector 7A which generates a tracking signal for controlling the light beams L1 and L2 and maintaining the light beams to trace the predetermined area of the optical disk, that is, the predetermined track. The remaining parts of the light beams L1 and L2 are reflected from the boundary face in the beam splitter 6 and pass through a convex lens 12 disposed on the light beam emerging surface of beam splitter 6. The light beams converged by the convex lens 12 are incident on a spatial filter 8 and are spatially separated into recording light beams and retrieving light beams. The recording beams are reflected from the spatial filter 8 and are converged on a photo-detector 7C. The retrieving beams pass through a pin hole 8A and are detected as a retrieving signal and a focusing control signal by photo-detectors 7B, 7D.

Alternatively, there has been known an optical information-processing apparatus which is provided with a multi-beam head for emitting a retrieving beam and a recording beam having different wavelengths from each other. With this apparatus, the recording light beams and retrieving light beams having different wavelengths from each other and emitted from respective light sources are synthesized by a dichroic mirror and are converged by an objective lens on the predetermined area of an optical disc. It is preferred that both beams L1 and L2 should be converged on the same track in such a manner that their converging points are arranged adjacent to each other. It mean that the adjacent small recording and retrieving beam spots are formed on the predetermined track on the recording surface. Similarly to the apparatus of FIG. 1, the converged beam spots are utilized to record information on the optical disc and to retrieve information therefrom. The light beams are reflected on the optical disc and are incident on a dichroic mirror to be divided into a recording light beam and a retrieving light beam. The divided beams generate an information signal and a focus control signal.

With the apparatus in which the retrieving light beam and the recording light beam are divided by the spatial filter having the pin hole, the light beams converged on the photo-detector through the pin hole are used to retrieve the information and to control the focus. In this arrangement, light beams must pass through the pin hole, and thus the spatial filter provided with the pin hole must be set at a high accuracy. The necessity of providing an optical system for focusing the light beam passing through the pin hole hinders the whole size of the head from being minimized. Further, since cross talks occur between the recording light beam and the retrieving light beam, the retrieving signal and the focus control signal cannot be accurately detected.

With the multi-beam optical head using two kinds of light beams consisting of the retrieving and recording light beams having different wavelengths from each other, on the other hand, it is difficult to form laser diode structures as the light sources in a single chip, and the two laser diode chips must be disposed closely adjacent to each other at a high mounting accuracy. Further, the usage of light beams having different wavelengths from each other requires the correction of chromatic aberrations of the lens occurring from the difference of the resolving powers of the optical systems.

With the apparatus for processing information optically, the retrieving light beam is converged by the optical detector for generating the focus control signal. The focus control signal is supplied to an objective lens drives circuit which drive a voice coil for driving the objective lens so that the focusing errors of the objective lens are corrected. As shown in FIGS. 2A to 2C, the focus control signal is generated by detecting the difference between the light intensities of beam spots on two photo-detecting areas 20A and 20B. In more detail, the generated focus control signal corresponds to the difference between the light intensity of the beam spot converged on the photo-detecting area 20A of the photo-detector 20 and the light intensity of the beam spot converged on the photo-detecting area 20B of the optical detector 20.

With the conventional focus control apparatus having a multi-beam optical head, two light sources are energized to emit two light beams but one of light beams forms a beam spot on the photo-detecting areas 20A and 20B and the intensity difference between the beam spot portions on the photo-detecting areas 20a and 20B is converted into focus control signal. When the objective lens is greatly deviated from the focusing state at the start of the focus control, that is, when the information recording medium is not in the range of the focal depth of the objective lens, two large images Sr and Sw are formed by the recording and retrieving light beams, as shown in FIGS. 2A and 2C. This creates a problem that the focus detecting sensitivity is lowered. In other words, when the objective lens is greatly separated from the information recording medium, thereby causing a large focus error, only a semicircular beam spot Sr produced by the retrieving light beams Lr is formed on the photo-detecting area 20A (FIG. 2A). To the contrary, when the objective lens is disposed too closely to the information recording medium, thereby causing a large focus error, a semicircular beam spot Sr is formed on the photo-detecting area 20B on the optical detector 20, and at the same time, a semicircular beam spot Sw produced by the recording light beams Lw is also formed on the optically detecting area 20A (FIG. 2C). It follows that the focus control signal which is generated when the objective lens is disposed far from the information recording medium are asymmetrical with that which is generated when the objective lens is disposed too closely to the information recording medium with respect to the zero level signal which is generated when the objective lens is maintained in the just focusing state (FIG. 3). This creates a further problem that the focusing of the objective lens cannot be accurately controlled

SUMMARY OF THE INVENTION

An object of this invention is to provide an optical information-processing apparatus having a multi-beam optical head which can detect one of the light beams reflected from an information recording medium to retrieve information and to maintain an objective lens in a focusing state in a stable manner.

Another object of this invention is to provide an optical information-processing apparatus having a multi-beam optical head which can detect one of retrieving and recording light beams reflected from an information recording medium to retrieve information and to maintain an objective lens in a focusing state in a stable manner.

According to one aspect of this invention, there is provided an apparatus for optically retrieving information from a recording medium, comprising:

means for selectively generating one and both of first and second light beams;

converging means having an optical axis, for converging said first and second light beams on said recording medium and transferring the first and second light beams from the recording medium, the first and second light beams being focused on the recording medium with a gap having a predetermined distance d1, when the converging means is in a focusing state in which the focused first and second light beams have smallest first and second beam spots on the recording medium, respectively;

separating means for spatially separating the transferred first light beam from the second light beam;

detecting means for detecting said first light beam separated by said separating means to produce a detecting signal, said detecting means having a side edge which is spaced at a distance d2 from said second light beam, when said converging means is in said focusing state, said detecting means being disposed in such a position that said first light beam is converged on said detecting means and the converged first light beam has a third beam spot on the recording medium, the third beam spot having a size substantially m times larger than that of said first beam spot, when said converging means is in said focusing state, m being adapted to satisfy the following expression:

$$d2 < m\, d1;\text{ and}$$

responsive means for energizing said moving means in response to said detecting signal from said detecting means to adjust a position of said converging means along said optical axis with respect to said recording medium.

According to another aspect of this invention, there is provided an apparatus for optically retrieving information from a recording medium, comprising:

means for selectively generating either one of first and second light beams;

converging means, having an optical axis and a numerical aperture of NA, for converging said first and second light beams on said recording medium to form first and second light beam spots on a track of said recording medium and transferring the first and second light beams, the smallest first and second beam spots spaced data distanced being formed on said recording medium in a focusing state;

moving means for moving said converging means along the optical axis;

separating means for separating the transferred first light beam from the transferred second light beam to converge said second light beam on an imaginary converging point in a focusing state;

detecting means for detecting said first light beam separated by said separating means to generate a detecting signal, said detecting means being arranged in such a position that said detecting means is exposed to a space through which said second optical beams pass and is spaced from said imaginary converging point at a distance Z along said second light beam, and said first light beam is converged on said detecting means to form a third beam spot having a size substantially m times larger than that of said first beam spot in said focusing state, m and Z being adapted to satisfy the following expression:

$$Z < (m\ d1) / (2\ NA);\ \text{and}$$

responsive means for energizing said detecting means in response to said detecting signal of said detecting means to adjust a position of said converging means in respect to said recording medium in a direction perpendicular to said optical axis of said converging means. An apparatus for optically retrieving information from a recording medium, comprising:

means for selectively producing either one of first and second light beams;

converging means having an optical axis, for converging said first and second light beams on said recording medium to form thereon the smallest first and second beam spots spaced at a distance d1 in a focusing state;

moving means for moving said converging means along said optical axis;

separating means for spatially effecting separation between said first light beams and said second light beams coming from said recording medium;

detecting means for detecting said first light beams separated by said separating means to produce a detecting signal, said detecting means having a side edge exposed to a space through which said second light beams separated by said separating means pass and are spaced at distance d2 from said second light beams in said focusing state, said detecting means being disposed in such a position that said first light beams are converged on said detecting means to form thereon a third beam spot having a size substantially m times larger than that of said first beam spot in said focusing state, m being adapted to satisfy the following expression:

$$d2 < m\ d1;\ \text{and}$$

responding means for energizing said moving means in response to said detecting signal from said detecting means to adjust a position of said converging means along said optical axis with respect to said recording medium.

BRIEF DESCRIPTION OF THE DRAWINGS

FIGS. 2A, 2B and 2C are plan views of the shapes of beam spots formed on the photo-detecting surfaces of the photo-detector for detecting the focusing of the optical system shown in FIG. 1 in three conditions;

FIG. 3 is a graph showing relations between the focusing errors of an objective lens and the focusing control signal generated by processing electrical signals from the photo-detector as shown in FIGS. 2A, 2B and 2C;

FIG. 4 is a schematic view of the optical head of an optical information-processing apparatus according to an embodiment of invention;

FIGS. 8A, 8B and 8C are plan views of the shapes of beam spots formed on the photo-detecting surfaces of the photo-detector for detecting the focusing state or the defocusing state of the objective lens as shown in FIG. 4 at the time when the focus control starts.

DETAILED DESCRIPTION OF THE PREFERRED EMBODIMENTS

Figure 1:
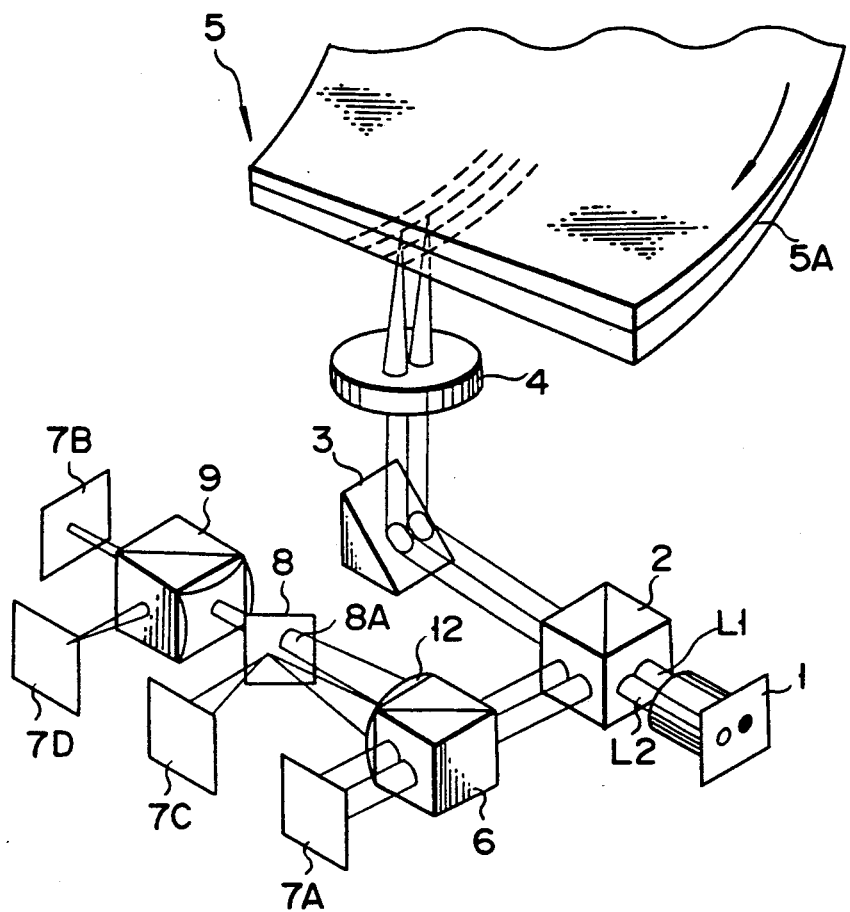
FIG. 1 is a schematic perspective view of the multi-beam type optical system of a conventional optical head.

FIG. 4 shows a multi-beam optical head 100 assembled in an optical information-processing apparatus according to an embodiment of the invention.

In FIG. 4, an optical recording medium, i.e., an optical disc 16 is a disc-like substrate made of glass, plastic material or the like and coated with a metallic film of tellurium, bismuth or the like as an information recording film. On the substrate of the optical disc are formed tracks 16A defining a tracking guide area. The multi-beam optical head 100 is placed opposed to the optical disc 16. At the time of recording, retrieving and erasing information, the optical disc 16 is rotated at a constant linear speed with respect to the multi-beam head 100. In FIG. 4, tracks 16B defining a recording area extend in the Z direction.

A light source unit 10 is mounted in the multi-beam optical head 100. In the light source unit 10, there are two laser structures for emitting two kinds of light beams, that is, recording light beams and retrieving light beams. Each laser structure has an array 10A of laser diodes separately energized by an energizing circuit 5. The exit points of the laser diode array 10A are formed on the same chip so as to be separated in the Z direction and to be directed in substantially the same direction. Retrieving light beams Lr and recording light beams Lw of the same wavelength, for example, are emitted from the exit points of the laser diode array 10A. The light beams Lr and Lw emitted from the laser diode array 10A are gradually diverged. Thus, the diverged light beams are overlapped with each other and are incident on a collimating lens 12. The overlapped light beams Lr and Lw are collimatted by the collimating lens 12 and are incident on an objective lens 14 through a beam splitter 18. The light beams passing through the objective lens 14 are converged and are again separated into the recording light beams Lw and the retrieving light beams Lr. Thus, the separated and converged light beams Lw and Lr are incident on the recording area of the optical disc 16, that is, on the tracks. Preferably, both light beams Lw and Lr are converged on adjacent points on the same track such that the adjacent recording and retrieving beam spots are formed on the predetermined track. The optical disc is rotated at the constant linear speed in the condition that the recording and retrieving spots are formed simultaneously. For example, first, the recording light beams Lw are converged on the predetermined recording area on the optical disc, and information is recorded thereon. As the optical disc is rotated, that area on the track on which the information has been recorded is moved and illuminated by the retrieving light beams Lr. The reflected portion of the retrieving light beams Lr falling on the recording area is detected, and the information is retrieved.

When the information is retrieved or when it is recorded, the objective lens 14 is held in a focusing state or in an on-tracking state. That is to say, the objective lens 14 is arranged to be movable in the directions of the optical axis and in a plane perpendicular to the optical axis. In the focusing state where the objective lens 14 is positioned in the optimal position on the optical axis or in the focusing position, the beam waists of the converging laser beams emitted from the objective lens 14 are formed on the recording surface of the optical disc 16, whereby the minimum beam spot is formed thereon. On the other hand, when the objective lens 14 is held in the on-tracking state where it assumes the optimal position or the on-tracking position in the plane perpendicular to the optical axis (a plane parallel to the recording surface), the beam spot is accurately formed on the track defined as a recording area so that the track is traced by the laser beams. While the objective lens is held in the focusing state and in the on-tacking state, the condition of the recording surface is changed, i.e., pits are formed in the recording surface by the intensively modulated recording light beams Lw so as to record the information. Upon converging the laser beams Lr of a constant light intensity on the recording area formed by the pits or the like on the track, the light beams is intensively modulated and reflected. The change of the light intensity of the reflected light beams is detected, and the information is retrieved.

From the starting of the tracking and focusing control to the predetermined elapsed time, the information-processing apparatus as shown in FIG. 4 operates such that only the retrieving laser structure of the laser diode array 10 is energized to produce the retrieving laser beams Lr by which the objective lens 14 is held in the on-tracking and focusing state.

The diverging recording and retrieving light beams Lr and Lw reflected from the recording surface of the optical disc 16 are synthesized and are incident on the objective lens 14. The synthesized light beams are converted into a parallel light beam by the objective lens 14 when the objective lens is maintained at the focusing state and the parallel light beam is returned to the beam splitter 18. The light beams entering into the beam splitter 18 are reflected from the boundary face 18A of the beam splitter 18. The synthesized light beams (the beams including the retrieving light beams Lr and the recording light beams Lw) are incident on a plano-convex lens 25 which is fixed to a beam splitter 27. Thus, the light beams are gradually converged, and the principal light ray lr and the principal light ray lw of the light beams Lr and Lw are gradually separated from each other. The synthesized beams enter a beam splitter 27 unitarily connected to the lens 25 and divided on the boundary face in the beam splitter 27 into two kinds of light beams LA and LB having the substantially same light intensity, the light beams LA being reflected on the boundary face and the light beams LB passing therethrough. The reflected light beams LA are used to obtain a focus control signal, while the passing light beams LB are employed for obtaining an information retrieving signal.

The light beams reflected in the beam splitter 27 will be explained in more detail. The retrieving light beams Lr and the recording light beams Lw included in the synthesized light beams LA which is reflected from the boundary face in the beam splitter 27 are reduced in diameter and are gradually separated from each other, as both light beams are converging. In the optical path of the light beams LA is provided a knife edge member 29 such that the principal light ray lr of the retrieving light beams Lr falls on its edge and the knife edge member 29 blocks substantially half lower part of the retrieving light beam Lr (FIG. 4). As a result, only the remaining unblocked half portion of the retrieving light beam Lr is gradually converged on a photo-detector 20 disposed in the optical path. The photo-detector 20 is previously set in such a position that the light beam is converged on the detecting area as the smallest spot in the focusing state, and the size of the photo-detector 20 is determined depending on the distance between the principal light ray lr of the retrieving light beam Lr and the principal light ray lw of the recording light beam Lw in a plane including the detecting surface of the detector.

The light beam converged on the photo-detector 20 is converted into electric signals on the respective photo-detecting areas and the electric signals are supplied to a focus control circuit 6. The electric signals are processed by the focus control circuit 6 to generate focusing control signal. In other words, a focusing control signal is generated in accordance with the positional deviation of the beam spot converged on the photo-detector 20. Then, an electric current corresponding to the focusing control signal is supplied from a drive circuit 44 to a voice coil motor 50 to drive the objective lens 14 along its optical axis such that the light beams are held in the focusing state. Part of the recording light beam Lw is blocked by the knife edge member 29, for example, and the remaining portion thereof passing over the knife edge member 29 travels through the space without being converged on the photo-detector 20.

On the other hand, similarly to the synthesized light beams LA reflected in the beam splitter 27, the principal retrieving light ray lr and the principal recording light ray lw of the synthesized light beams LB passing the beam splitter 27 are gradually separated from each other, as the retrieving light beam Lr and the recording light beam Lw included in the compound light beams LB are gradually reduced in cross section. In the optical path of the retrieving light beam separated from the recording light beam Lw is provided a photo-detector 24 for detecting the retrieving signal and the tracking signal which hold the light beams on the predetermined track on the optical disc. The photo-detector 45 is disposed in such a position that a circular beam spot having a predetermined size is formed on its detecting surface in the focusing state. The size of the photo-detector 4 is determined in consideration of the distance between the principal light lw of the recording light beams Lw and the principal light lr of the retrieving light beams Lr on a plane including the detecting surface of the photo-detector 45. In other words, the photo-detector 45 is sized such that it is disposed in the range on which the retrieving light beam Lr is illuminated but the recording light beam Lw is not incident and in which the photo-detector 45 can accurately carry out tracking control by utilizing a diffraction pattern of the beam spot of the retrieving light beams.

The electrical signals from the tracking photo-detector 45 are converted by a tracking circuit 7 into a tracking signal and the tracking signal is supplied to the drive circuit 44. According to the tracking signal, electric currents are supplied from the drive circuit 44 to the voice coil motor 50 to move the objective lens 1 in a plane perpendicular to it optical axis. This movement of the objective lens 14 allows the light beams to be directed to the predetermined track to trace the same.

The signals detected in the detecting area of the photo-detector 45 are converted into information retrieving signal by a retrieve circuit 8 and the information retrieving signal is supplied to a following circuit in which the information retrieving signal is converted into an image signal. The recording light beam Lw which is spatially separated from the retrieving light beam Lr is not incident on the photo-detector 45 but travel through the space thereover.

Figures 5A, 5B, 5C:
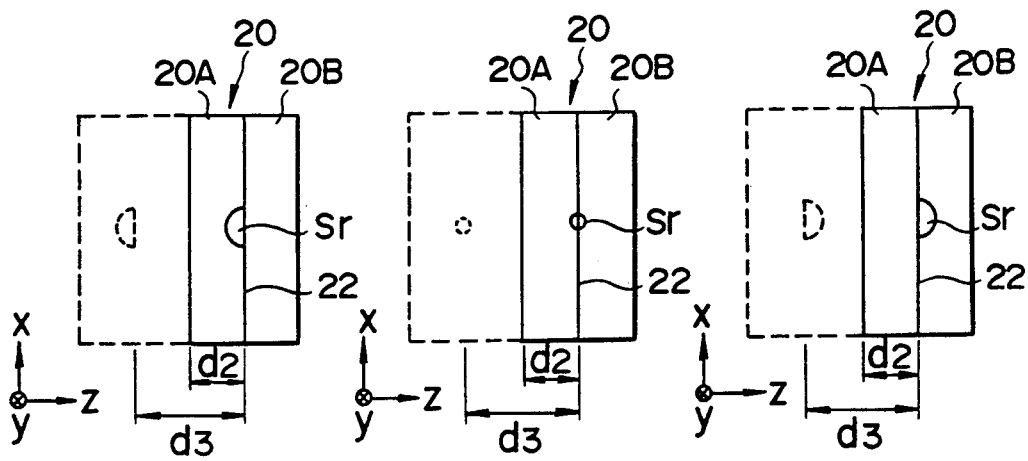
FIGS. 5A, 5B and 5C are plan views of the shapes of beam spots formed on the photo-detecting surfaces of the photo-detector for detecting the defocusing or focusing state of the objective lens as shown in FIG. 4.

FIGS. 5A and 5C show the shape of the beam spot formed on the photo-detector 20 in the defocusing states, while FIG. 5B shows the shape of the beam spot thereon in the focusing state. The focus control photo-detector 20 is disposed in the optical path of the retrieving light beam Lr separated from the light beam Lw and is divided into two photo-detecting areas 20A and 20B by a photo-insensitive region 22 extending in the longitudinal direction X. When the objective lens 14 is in the focusing state with respect to the optical disc 16 as shown in FIG. 5B, the smallest spot Sr is formed on the photo-insensitive region 22. Assuming that the outputs of the photo-detecting areas 20A and 20B are (1) and (2), respectively, a focusing control signal having zero level is produced, that is, F E={(1)−(2)}=0, in the focusing state.

On one hand, when the objective lens 14 is in the defocusing state in which the objective lens 14 is deviated from the focusing position in a direction departed far from the optical disc, the degree of convergence of the light beams reflected by the optical disc is slightly smaller than that of the light beams in the focusing state, and the converging point of the light beam Lr partially blocked by the knife edge member 29 and falling on the photo-detector is shifted before the photo-detector. Then, the beam spot as shown in FIG. 5C is formed on the photo-detector 20. That is to say, the straight line of the semi-circular beam spot is formed on the photo-insensitive region and the semi-circular beam spot having a size larger than that of the beam spot which is formed when the objective lens is in the focusing state, is formed on the photo-detector 20. Accordingly, a focusing signal F E={(1)−(2)}<0 is generated.

On the other hand, when the objective lens 14 is in the defocusing state in which the objective lens is approached to the optical disc from the focusing position, the degree of the convergence of the light beams reflected from the optical disc is slightly larger than that of the light beams in the focusing state, and the converging point of the light beams Lr partially blocked by the knife edge member 29 and illuminated on the photo-detector is shifted behind the photo-detector such that the beam spot as shown in FIG. 5A is formed on the photo-detector. Namely, the straight line of the semi-circular beam spot is formed on the photo-insensitive region and the semi-circular beam spot having a size larger than that of the beam spot which is formed when the objective lens is in the focusing state, is formed on the photo-detector 20. Accordingly, a focusing signal F E=(1)−(2)}>0 is generated.

The size of the photo-detector is determined by the following conditions:

Assuming in FIG. 4 that the distance between the beam spots of retrieving light beams Lr and the recording light beams Lw formed on the same track is, d1, the focal length of the objective lens 14 converging the light beams on the optical disc is f0 and the focal length of the lens 25 is fD, the distance d3 between the converging points of the recording light beams Lw and the retrieving light beams Lr is expressed by $$d3 = (fD/f0) \times d1 = m\, d1 \quad (1)$$

where m is the magnification of the optical system.

In order to converge only retrieving the light beam on the photo-detector 20, the following condition must be satisfied for the distance d2 between the converging point and that edge of the photo-detector 20 which is parallel to the photo-sensitive region and is disposed at the side of the imaginary converging point of the recording beams Lw shown by dashed lines:

$$d3 > d2 \quad (2)$$

From the expressions (1) and (2), it is required that $$d2 < (fD/f0) \times m\, d1 \quad (3)$$

As understood from this expression, the distance d2 between the imaginary converging point and the side edge of the photo-detector which is closed to the imaginary converting point should substantially satisfy $d2 < m\, d1$. Arrangement of such a photo-detector satisfying the condition $d2 < m\, d1$ prevents cross talks between the recording light beam and the retrieving light beam and allows the effective reading and retrieving of information.

The size of the photo-detector 20 will be explained more concretely.

In the embodiment of this invention, a knife edge method is used to obtain focus control signal. The knife edge method can reduce the size of beam spots formed on the photo-detector in the focusing state as compared with a focus control method such as the astigmatism method, resulting in the easier manufacturing of the photo-detector 20. When the focusing control is carried out by using the conventional astigmatism method, it is said that the beam spot having a beam diameter of 50 micrometers or more must be formed on the photo-detector in the focusing state. Therefore, it is considered that, upon using the astigmatism method, the principal light rays lr and lw of the retrieving and recording light beams must be separated by 100 microns or more in a plane on which the photo-detector is disposed in order to avoid cross talks.

With the focus detecting method such as the knife edge method applied to this invention, however, the photo-detector is disposed on the focus point of the lens 25, whereby the diameter W1 of the beam spot converged on the photo-detector is rendered minimum as defined by the numerical aperture NA, the magnification of the optical system and the wavelength λ of the light source. In other words, the diameter W1 of the beam spot on the recording medium is given by $W1 = \lambda/NA0$, where NA0 is the numerical aperture of the optical system determined on the basis of the recording medium. Moreover, the numerical aperture NAD of the optical system determined on the basis of the photo-detector 20 is defined by $NAD = NA0/m$. The diameter W2 of the beam spot of the light beam formed on the detector 20 is expressed by $W2 = \lambda/NAD = m\lambda/NA0$.

In the practically used optical system, the numerical aperture NA is 0.4 to 0.6; λ, 600 to 900 nm; and m, 2 to 10 in general.

Taking NA of 0.5, λ of 830 nm and m of 7, for example, the diameter W2 of the beam spot on the photo-detector is $m\lambda/NA0 = 10$ micrometers.

The arrangement in which the photo-detector 20 is located on the image points of the light beam spots formed on the optical disk 16 renders the size of the beam spots very small in such a manner that the recording and retrieving light beams separated at a very small interval can be separately detected with ease.

Figures 6A, 6B, 6C:
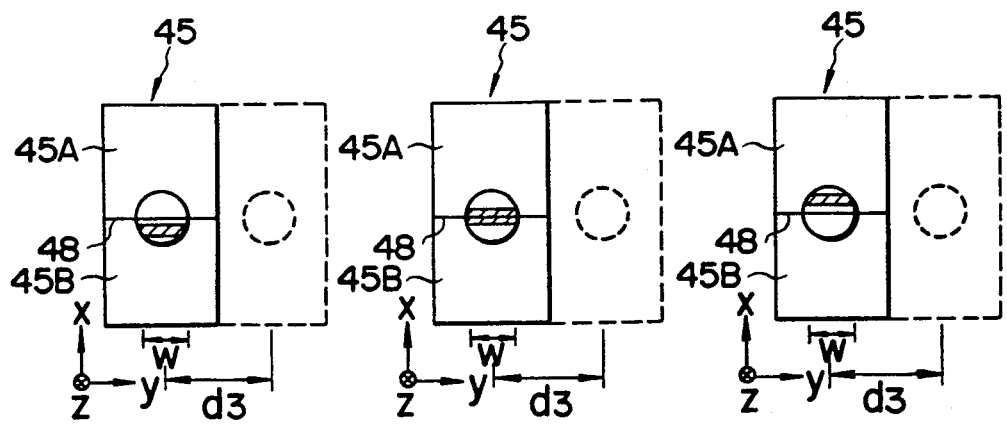
FIGS. 6A, 6B and 6C are plan views of the shapes of beam spots formed on the photo-detecting surfaces for detecting the tracking state or miss-tracking state of the objective lens as shown in FIG. 4.

FIGS. 6A and 6C show beam spots formed on the photo-detector 45 in the defocusing states, and FIG. 6B shows a spot formed thereon in the focusing state. The tracking control photo-detector 45 is placed in the optical path of the retrieving light beam Lr in the light beams LB, and the photo-detecting surface of the detector 45 is divided into two photo-detecting areas 45A and 45B by a photo-insensitive region 48 extending in the traverse direction (that is, in the Y direction). When the beam spot is formed by the objective lens 14 on the track defining a recording area on the optical disc, that is, when the objective lens 14 is in the tracking state, a substantially circular beam spot Sr having a predetermined beam diameter is formed on the photo-insensitive region 48, and a dark portion (the hatched portion in the FIGURE) produced by the diffraction light rays from the track is formed o the photosensitive region 48. Assuming that the outputs from the photo-detecting areas 45A and 45B be (3) and (4), respectively, the tracking error signal T E having the zero level is generated which satisfies the condition that T E={(3)−(4)}=0.

With the objective lens 14 deviated from the tracking position, circular beam spots are formed as shown in FIGS. 6A and 6B and the dark portion formed by the diffraction light rays from the track is shifted from the photo-insensitive region 48. Thus, the focusing error signal T E becomes negative or positive.

This photo-detector 45 is set at such a position on its optical axis that the diameter of the beam spot of the converging light beam is within a specific range. In other words, the photo-detector 45 is sized such that only the retrieving light beam Lr are converged thereon.

In more detail, the photo-detector is positioned as follows:

It is assumed that the distance between the beam spots of the retrieving light beam Lr and the recording light beam formed on the same track is d1, the focal length of the objective lens 14 is f0, the focal length of the lens 25 is fD and the distance along the optical axis between the detecting surface of the photo-detector 45 and the focal point of the lens 25 is Z and the distance Z is negligibly small as compared with the focal length fD. Then, the distance between the focal points of the recording light beams Lw and retrieving light beam Lr can be expressed by $$d3 = (fD/f0) \times d1 = m \, d1 \qquad (4)$$

In this case, the beam diameter W is indicated by $$W = Z/fD \times \phi \qquad (5)$$

where $\phi$ is the diameter of the light beams emitted to the lens 25.

In order that only the retrieving light beam is incident on the detecting areas of the photo-detector 45, it follows that $$d3 > W \qquad (6)$$

Substituting Equations (4) and (5) into Expression (6), it is found that the distance Z between the detecting surface of the photo-detector 45 and the focal point of the lens 25 should be within the range defined by $$Z < (fD)^2/f0 \times (d1/\phi) \qquad (7)$$

Expression (7) is rewritten into a general form $$Z < (m^2 d1)/(2 \, NA) \qquad (8)$$

where m is the magnification of the optical system and NA is the numerical aperture of the objective lens. The location of the photo-detector 45 within the range defined by Expression (8) permits the retrieving and recording light beams to be converged on the photo-detector 45 in a separated state from each other. This prevents cross talks between the retrieving and recording light beams Lr and Lw and allows accurate tracking signals to be detected.

Figure 7:
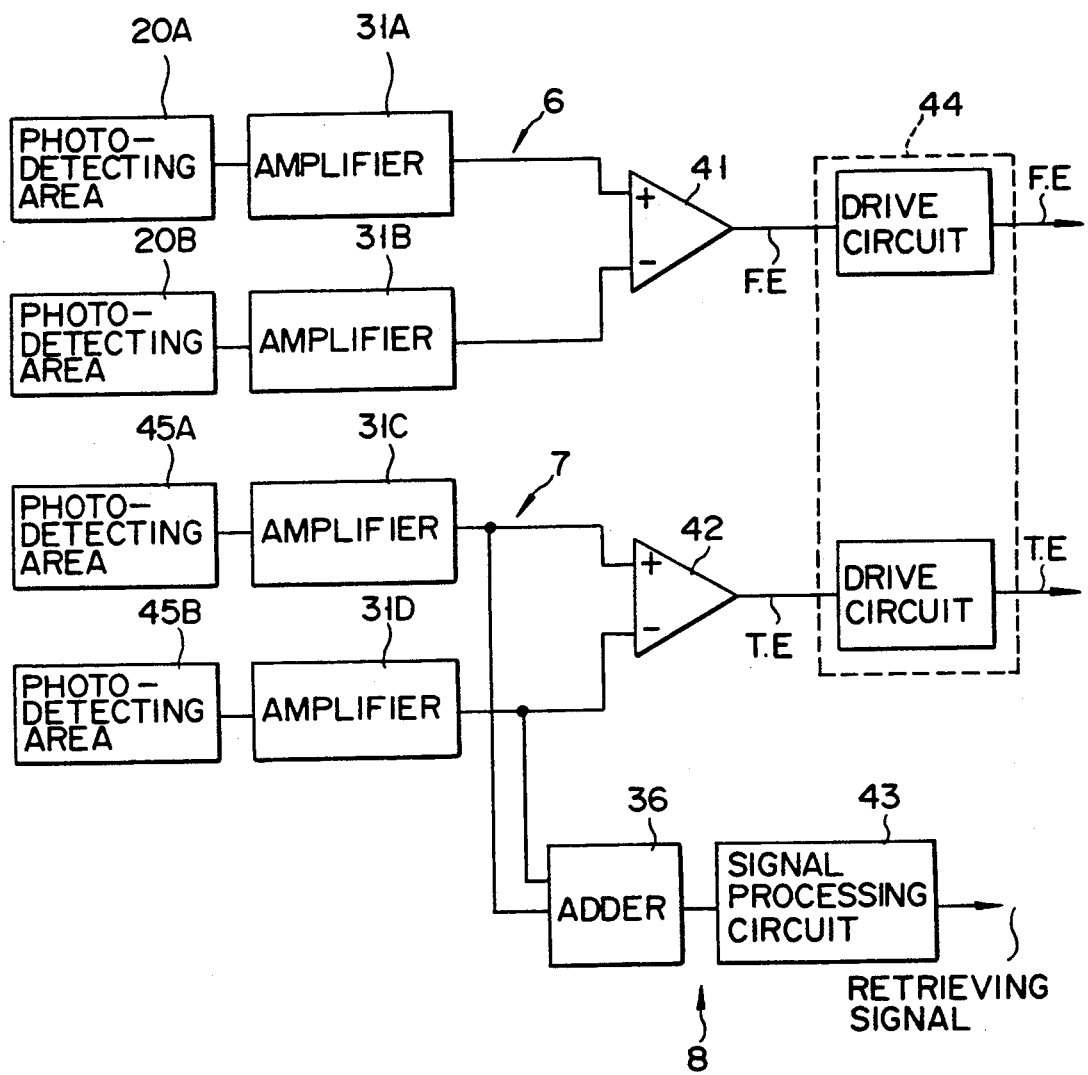
FIG. 7 is the block diagram of a signal processing circuit a shown in FIG. 4.

As shown in FIG. 7, the signals detected by the tracking control photo-detector 45 are used as tracking control servo signal, on one hand, and as an information retrieving signal formed on the information recording medium, on the other hand. In more detail, the output of the photo-detecting areas 20A and 20B are supplied to amplifying circuits 31A and 31B, respectively. Thereafter, the outputs of the amplifying circuits 31A and 31B are supplied to the respective non-inversion input terminals of a differential amplifier 41 and are compared by the amplifier 41, from which a focus control signal or a focus displacement signal corresponding to the difference between the outputs of the circuits 31A and 31B is supplied to a drive circuit 44. An electric current corresponding to the focus control signal is supplied to a coil (not shown) by which the objective lens 14 is driven in the required direction of the optical axis to correct the defocusing state of the objective lens.

The outputs of the photo-detecting areas 45A and 45B are supplied to amplifying circuits 31C and 31D, respectively. Thereafter, the outputs of the amplifying circuits 31C and 31D are supplied to the corresponding non-inversion inputs of an differential amplifier 42. Supplied to the drive circuit 44 is a tracking signal which corresponds to the difference between the outputs of the amplifying circuits 31C and 31D. An electric current corresponding to the tracking signal is supplied to a coil for driving the objective lens 14 in a plane perpendicular to its optical axis so as to correct the tracking displacement. Further, the outputs of the amplifying circuits 31C and 31D are added and processed to be converted into a information retrieving signal.

As described above, at the initial stage of the tracking and focus control, that is, from the starting time to the predetermined elapsed time thereof, only the retrieving laser structure of the laser diode array 10 is energized by the laser energizing circuit 5 to generate only the laser beams Lr. At the initial stage of the tracking and focus control, therefore, only the retrieving laser beams Lr pass through the optical path defined by the optical system shown in FIG. 4 as described above and are introduced into the focusing photo-detector 20 and the tracking photo-detector 45. This prevents the recording laser beams from being projected on the detectors 20 and 45 as shown in FIG. 4. Since the beam spot is formed on the detector 20 only by the retrieving laser beam Lr as shown in FIGS. 8A and 8C, a focus signal of a very low noise is obtained, and the objective lens 14 is quickly moved to the tracking position, as shown in FIG. 8B. Similarly, the beam spot is formed on the detector 45 only by the retrieving laser beams Lr. Thus, the tracking signal of a low noise is obtained, and the objective lens 14 is moved to the focusing position. After the objective lens 14 has been moved to be in the focusing and on-tracking states, not only the retrieving laser structure of the laser diode array 10 but also the recording laser structure of the laser diode 10 are energized by the laser energizing circuit 5 such that the retrieving and recording laser beams are generated from the laser diode array 10. As described above, the retrieving and recording are carried out simultaneously and the focusing and on-tracking states are maintained as well.

The recording laser beams are generated at the predetermined time after the initiation of the tracking an focus controls. This time interval is defined as the operating time interval in which the objective lens is focused within a predetermined allowance, for example, within the range of the focal depth or is directed to the track in response to the focus signal generated by the retrieving laser beams Lr.

The knife-edge detecting method is used in the focus control photo-detector of the above-mentioned embodiment of this invention. However, other methods for detecting focuses may be employed. When other methods are used, the photo-detector is made to have a specific size and is placed on the focal point of the light beams, whereby cross talks between the two kinds of light beams can be reduced and the stable focus control signal can be obtained.

With this invention, two kinds of light beams emitted from the light source unit 10 are converged on the same track of the information recording medium such that the recording is effected immediately after the retrieving. Alternatively, light beams may be converged on two parallel tracks to record or retrieve information on the two tracks simultaneously. Moreover, this invention may be used to erase and record information in succession.

What is claimed is:

1. An apparatus for optically retrieving information from a recording medium, comprising:
   generating means for selectively generating first and second light beams;
   converging means, having an optical axis and being movable along the optical axis, for converging the first and second light beams on said recording medium to form first and second light beam spots on said recording medium, wherein the first and second light beam spots are separated at a predetermined distance d1 and are smallest in size, respectively, when said converging means is maintained in a focusing state;
   separating means for converging the first and second light beams from the recording medium and spatially separating the first light beam from the second light beam;
   detecting means for detecting the first light beam separated by said separating means to produce a detecting signal, said detecting means having a side edge which is spaced at a distance d2 from said second light beam, when said converging means is in said focusing state, said detecting means being disposed in such a position that said second light beam passes outside of said detecting means and said first light beam is converged on said detecting means to form a third light beam spot on said detecting means, wherein the third light beam spot has a size substantially m times larger than that of said first light beam spot, when said converging means is in said focusing state, and m is adapted to satisfy the following expression:

$d2 < m \cdot d1$; and responsive means for moving said converging means in response to said detecting signal from said detecting means to adjust a position of said converging means along said optical axis with respect to said recording medium.

2. The apparatus according to claim 1, further comprising energizing means for energizing said generating means to cause said generating means to generate only the first light beams before said responsive means starts to move said moving means.

3. The apparatus according to claim 1, wherein the apparatus is configured such that the first and second light beams are directed into substantially the same optical path from said generating means to the recording medium and from the recording medium to said separating means.

4. The apparatus according to claim 1, further comprising shifting means, disposed between said separating means and said detecting means, for shifting a first light beam spot on said detecting means in response to movement of said converging means along the optical axis.

5. The apparatus according to claim 4, wherein said shifting means comprises a knife edge member which blocks part of said first light beam.

6. An apparatus for optically retrieving information from a recording medium having a track, the apparatus comprising:
   generating means for selectively generating first and second light beams;
   converging means, having an optical axis and a numerical aperture of NA, for converging said first and second light beams on said recording medium to form first and second light beam spots on the track of said recording medium, wherein the first and second light beam spots are spaced at a predetermined distance d1 and are smaller in size, respectively, when said converging means is maintained in a focusing state;
   moving means for moving said converging means along the optical axis in a direction perpendicular to the optical axis;
   separating means for converging the first and second light beams from the recording medium and spatially separating the first light beam from the second light beam, wherein said second light beam forms an imaginary smallest convergent point when said converging means is maintained in a focusing state;
   detecting means for detecting said first light beam separated by said separating means to generate a detecting signal, said detecting means being arranged in such a position that said second light beam passes outside of said detecting means, said detecting means is spaced from said imaginary converging point at a distance Z along said second light beam, and said first light beam is converged on said detecting means to form a third light beam spot having a size substantially m times larger than that of said first light beam spot, when said converging means is maintained in said focusing state, wherein m and Z are adapted to satisfy the following expression:

$$Z < (m^2 d1) / (2\ NA);\ \text{and}$$

responsive means for moving said converging means in response to said detecting signal of said detecting means to adjust a position of said converging means with respect to said recording medium in a direction perpendicular to said optical axis of said converging means.

7. The apparatus according to claim 6, further comprising energizing means for energizing said generating means to cause said generating means to generating only said first light beam before said responsive means starts to move said moving means.

8. The apparatus according to claim 6, wherein the apparatus is configured such that the first and second light beams are directed into substantially the same optical path from said generating means to the recording medium and from the recording medium to said separating means.

* * * * *